United States Patent [19]
Coley et al.

[11] Patent Number: 6,061,798
[45] Date of Patent: May 9, 2000

[54] FIREWALL SYSTEM FOR PROTECTING NETWORK ELEMENTS CONNECTED TO A PUBLIC NETWORK

[75] Inventors: Christopher D. Coley, Morgan Hill; Ralph E. Wesinger, Jr., Livermore, both of Calif.

[73] Assignee: Network Engineering Software, Inc., San Jose, Calif.

[21] Appl. No.: 09/174,723

[22] Filed: Oct. 19, 1998

Related U.S. Application Data

[63] Continuation of application No. 08/595,957, Feb. 6, 1996, Pat. No. 5,826,014.

[51] Int. Cl.[7] .................................................. G06F 13/00
[52] U.S. Cl. ............................................................ 713/201
[58] Field of Search ............................. 395/186, 187.01, 395/188.01, 200.55, 200.59, 726; 713/200, 201, 202; 340/825.31, 825.34; 364/222.5, 286.4, 286.5, 479.07; 380/3, 4, 24, 25, 30, 48

[56] References Cited

U.S. PATENT DOCUMENTS

| | | | |
|---|---|---|---|
| 4,713,753 | 12/1987 | Boebert et al. | 711/164 |
| 4,727,243 | 2/1988 | Savar | 705/17 |
| 4,799,153 | 1/1989 | Hann et al. | 340/825.34 |
| 4,799,156 | 1/1989 | Shavit et al. | 705/26 |
| 5,191,611 | 3/1993 | Lang | 380/25 |
| 5,241,594 | 8/1993 | Kung | 380/4 |
| 5,416,842 | 5/1995 | Aziz | 380/30 |
| 5,483,661 | 1/1996 | Yoshida et al. | 395/800.26 |
| 5,491,752 | 2/1996 | Kaufman et al. | 380/30 |
| 5,495,533 | 2/1996 | Lineham et al. | 380/21 |
| 5,548,721 | 8/1996 | Denslow | 380/23 |
| 5,550,984 | 8/1996 | Gelb | 395/200.75 |
| 5,577,209 | 11/1996 | Boyle et al. | 340/825.31 |
| 5,590,199 | 12/1996 | Krajewski, Jr. et al. | 380/25 |
| 5,602,918 | 2/1997 | Chen et al. | 380/21 |
| 5,606,668 | 2/1997 | Shwed | 380/42 |
| 5,623,600 | 4/1997 | Ji et al. | 395/187.01 |
| 5,623,601 | 4/1997 | Vu | 713/202 |
| 5,632,011 | 5/1997 | Landfield et al. | 345/326 |
| 5,636,371 | 6/1997 | Yu | 395/500 |
| 5,638,448 | 6/1997 | Nguyen | 380/29 |
| 5,657,452 | 8/1997 | Kralowetz et al. | 395/200.57 |
| 5,668,876 | 9/1997 | Falk et al. | 380/25 |
| 5,687,235 | 11/1997 | Perlman et al. | 380/25 |
| 5,826,014 | 10/1998 | Coley et al. | 713/202 |
| 5,889,943 | 3/1999 | Ji et al. | 395/187.01 |
| 5,903,718 | 5/1999 | Marik | 395/183.14 |
| 6,003,084 | 12/1999 | Green et al. | 709/227 |

OTHER PUBLICATIONS

Goldberg, "The Mitre Security Perimeter", Computer Security Applications Conference, pp. 212–218, Dec. 1994.
Bellovin et al., "Network Firewalls", IEEE Communications Magazine, pp. 50–57, Sep. 1994.
Stempel, "IpAcess–An Internet Service Access System for Firewall Installations", IEEE, pp. 31–41, Dec. 1995.
Neuman, "Proxy–Based Authorization and Accounting for Distributed Systems", IEEE, pp. 283–291, May 1993.
Microsoft Press, Computer Dictionary, 2nd Ed, definition of "daemon", pp. 104, Dec. 1994.

*Primary Examiner*—Robert W. Beausoliel, Jr.
*Assistant Examiner*—Stephen Elmore
*Attorney, Agent, or Firm*—McDonnell Boehnen Hulbert & Berghoff

[57] ABSTRACT

A firewall for isolating network elements from a publicly accessible network to which such network elements are attached. The firewall operates on a stand alone computer connected between the public network and the network elements to be protected such that all access to the protected network elements must go through the firewall. The firewall application running on the stand alone computer is preferably the only application running on that machine. The application includes a variety of proxy agents that are specifically assigned to an incoming request in accordance with the service protocol (i.e., port number) indicated in the incoming access request. An assigned proxy agent verifies the authority of an incoming request to access a network element indicated in the request. Once verified, the proxy agent completes the connection to the protected network element on behalf of the source of the incoming request.

1 Claim, 5 Drawing Sheets

FIREWALL SYSTEM FOR PROTECTING NETWORK ELEMENTS CONNECTED TO A PUBLIC NETWORK

This is a continuation of application Ser. No. 08/595,957, filed Feb. 6, 1996, U.S. Pat. No. 5,826,014.

BACKGROUND

The present invention relates to a system for protecting network elements connected to a public network from access over the public network, and more specifically, to a firewall system for protecting network elements connected to the Internet.

The Internet has experienced, and will continue to experience, explosive growth. As originally designed, the Internet was to provide a means for communicating information between public institutions, particularly universities, in a semi-secure manner to facilitate the transfer of research information. However, with the development and provision of user friendly tools for accessing the Internet, such as the World Wide Web (the Web), the public at large is increasingly turning to the Internet as a source of information and as a means for communicating.

The Internet's success is based, in part, on its support of a wide variety of protocols that allows different computers and computing systems to communicate with each other. All of the Internet-compatible protocols, however, find some basis in the two original Internet protocols: TCP (Transmission Control Protocol) and IP (Internet Protocol). Internet protocols operate by breaking up a data stream into data packets. Each of data packet includes a data portion and address information. The IP is responsible for transmitting the data packets from the sender to the receiver over a most efficient route. The TCP is responsible for flow management and for ensuring that packet information is correct. None of the protocols currently supported on the Internet, however, provides a great degree of security. This factor has hindered the growth of commercial services on the Internet.

The government, in learning of the Internet's limited transmission security capacity, has resorted to encoding secure messages using complex encryption schemes. The government abandoned consideration of the Internet for high security information, relying instead on privately operated government networks. The general public, without such concerns, has come to increasingly use the Internet. Furthermore, businesses having recognized the increasing public use of, and access to the Internet, have turned to it as a marketing mechanism through which to disseminate information about their products, services and policies.

A popular way for commercial institutions to supply information over the Internet is to establish a homepage on an Internet multi-media service known as the World Wide Web. The World Wide Web ("Web") provides a user-accessible platform that supplies information in text, audio, graphic, and video formats. Each homepage document can contain embedded references to various media. A Web user can interactively browse information by responding to entry prompts nested in a screen within a homepage. Web documents are accessed by using a TCP/IP compatible protocol called HyperText Transfer Protocol (HTTP). A user logged onto the Internet can access a "Web site" by supplying the Web site's address (e.g., "http://srmc.com"). Entry of such an address establishes a session between the user and the Web site.

Provision of a Web homepage involves establishing a user accessible file at a Web site. The Web site can be established on a computing system on the premises of the business or institution providing the homepage, or by contracting to have the homepage built and supported on the computing facilities of an Internet Service Provider (ISP). The assignee of the present application, Scientific Research Management Corporation (SRMC), is an Internet Service Provider.

Use of a company's computing system for support of a publicly accessible system, such as a Web site, can present a threat to the company's internal systems that share the same computing platform, or are connected to the publicly accessible computing platform. Furthermore, in cases where sensitive information is transmitted over the Internet to a company, such information is usually stored on the same computing system that is used for running the on-line Internet system. For instance, some businesses now publish homepage catalogs offering services and products for sale. A user can select products or services from a homepage catalog in an interactive session. After selecting the desired products or services, the homepage may present a payment screen inviting the user enter credit card information. Handling of such information over a public network such as the Internet, requires some measure of security to prevent the information from being intercepted. However, a more important consideration is maintaining the security of such information once it is received and stored in a computing system that is connected to the Internet.

Most computer crime is not in the form of data interception, but involves a network intruder, or "hacker" entering a publicly-accessible computing system and subverting security systems to access stored information. In the recent past there have been several publicized cases where hackers have stolen proprietary information from purportedly secure computers over the Internet.

In many cases where a publicly accessible application, such as a homepage, is set up on a business or institution's premises, it is grafted onto an existing computing system. The existing system also may contain other computing resources such as data bases, and/or internal network systems that are not intended for public access. Provision of a publicly accessible on-line system, such as a Web server, on such a system can provide a scenario that can be exploited by network intruders who may attempt reach systems beyond the Web server using it, or other systems bundled on the computing platform, as access paths. A company or institution may attempt to protect these surrounding systems by password protecting them, or by concealing them from the public with a system called a firewall.

Password protected systems are well known. However, a password prompt announces the presence of proprietary systems and may be an invitation for a hacker to investigate further. Because password systems are widely known, they are somewhat susceptible to hackers who have developed techniques for cracking, bypassing or subverting them. Using conventional desktop computers, hackers have been known to decipher passwords of reasonable lengths in a very short period of time. Provision of longer passwords may thwart a hacker's attempts, but at the expense of user convenience.

The term "firewall" was coined in the computer network environment to describe a system for isolating an internal network, and/or computers, from access through a public network to which the internal network or computers are attached. The purpose of a firewall is to allow network elements to be attached to, and thereby access, a public network without rendering the network elements susceptible to access from the public network. A successful firewall allows for the network elements to communicate and transact with the public network elements without rendering the network elements susceptible to attack or unauthorized inquiry over the public network. As used herein, the term "network element" can refer to network routers, computers, servers, databases, hosts, modems, or like devices that are typically associated with a computer network.

One technique used by firewalls to protect network elements is known as "packet filtering." A packet filter investigates address information contained in a data packet to determine whether the packet machine, from which the packet originated, is on a list of disallowed addresses. If the address is on the list, the packet is not allowed to pass.

One problem with packet filtering is that when unknown address information is encountered in the filtering check (i.e., the packet's address is not on the list), the packet is usually allowed to pass. This practice of allowing unknown packets to pass is based on an Internet design philosophy that promotes the ease of information transfer. Hence, most firewall systems utilizing packet filtering operate on an "allow to pass unless specifically restricted" basis. This practice is invoked with the perception that the packet will eventually be recognized and appropriately routed down stream of the packet filter. However this practice provides hackers with a means with which to bypass a packet filter.

Hackers have developed a technique known as "source based routing," "packet spoofing," or "IP spoofing" wherein address information within a fabricated packet is manipulated to bypass a packet filter. All network elements that are addressable over the Internet have an address consisting of four octets separated by periods. Each of the octets is an eight bit sequence representing a decimal number between zero and 255. A host computer on the Internet might have an IP address: 19.137.96.1. Source based routing involves a hacker inserting an address of a machine that resides "behind" a firewall into the source address field of a fictitious packet. Such a packet can usually pass through a firewall because most firewalls are transparent to messages that originate from behind the firewall, because the firewall assumes that such messages are inherently valid. To prevent this type of packet spoofing, the packet filter's list of disallowed addresses includes the addresses of elements residing behind the firewall.

Another packet spoofing technique involves setting the "session active" bit of a packet. By setting this bit in a packet, a packet filter receiving the packet assumes that a valid session has already been established, and that further packet filtering checks are not necessary, thereby allowing the packet to pass. A spoofed packet having its session active bit set can contain an "establish connection" message. Such a packet can be used to establish a session with a machine behind the firewall.

Additional packet filtering techniques involve investigations of data portions of packet to determine whether there are any suspect contents, and or investigations of suspect protocol designations. However, the drawback of these and the aforementioned packet filtering schemes is that, when used in combination, they are cumbersome. This practice impairs the speed with which packet filters do their job.

Conventional firewalls also may use an application gateway, or proxy system. These systems operate on the basis of an application, or a computing platform's operating system (OS), monitoring "ports" receiving incoming connection requests. A port is a numerically designated element contained in the overhead of a packet. A port number indicates the nature of a service associated with a packet. For example, a packet associated with the Telnet service has a port number of 23, and the HTTP service is assigned port number 80. These port number designations are merely industry suggested, a packet containing a port designation of 23 need not necessarily be associated with Telnet services. When the OS or monitoring application receives a request on a particular port, a connection is opened on that port. A program for managing the connection is then initiated, and the firewall starts a gateway application, or proxy, that validates the connection request. However, such a system is vulnerable and inefficient because of the resource intensive nature of the processes involved.

Hackers have been known to inundate a port with large numbers of slightly varying access requests in an attempt to slip a packet by an application gateway or proxy. This method of attack is known as a "denial of service attack." The typical response to such an attack is to have the OS shut down the targeted port for a period of time. This defense response is necessitated by the inefficiency of conventional port processing. The chain of processes associated with monitoring, managing, and verifying port connections is very inefficient. A denial of service attack can unduly burden system resources. Consequently, the conventional defense is to have the OS shut down the port for a period of time. This security technique prevents entry into a system through that port and restores the availability of system resources. However, it also prevents a user behind the firewall from accessing the port that has been shut down. Hence, this security measure is unacceptable.

Another problematic aspect of conventional firewall arrangements, from a security perspective, is the universal practice of combining a firewall with other packages on a same computing system. This arises in two situations. The first is where the firewall package, in and of itself, is a combination of applications. For example, Trusted Information Systems's recently released Gauntlet application is a combination Web server and firewall. The second situation is the aforementioned practice of hosting publicly accessible and/or unrelated services on a same computing platform that supports the firewall. The services sharing the platform with the firewall may include E-mail, Web servers, or even the system that the firewall is set up to protect (e.g., a database). This situation was discussed briefly above with respect to many companies' practice of grafting a firewall application onto their existing computer systems.

The provision of applications on top of, or in addition to, the firewall on a computing system provides a path through which a hacker can get behind the firewall. This is done by using the unrelated applications to attack the firewall, or to directly connect with network elements being protected by the firewall. The firewall may fail to recognize the attack because the application being exploited by the hacker is authorized to communicate through the firewall. In addition, the firewall might not be able to protect against unexpected flank attacks from shared applications because it is set up specifically to monitor requests from a designated publicly accessible application. Alternatively, the shared application may be used to completely bypass the firewall and attack, or directly connect to, a protected network element.

An example of a conventional firewall arrangement is depicted in FIG. 1. A host computer 100 communicates with a institutional computer system 106 over a public network 102 through a router 104. A router is a network element that directs a packet in accordance with address information contained in the packet. The institutional computer system 106 supports a variety of applications including a Web server 108, and an E-mail system 114. A firewall system 110 also is hosted on the institutional computer 106 to protect a port 112 that connects an internal network 116 to the institutional computer system 106. The internal network 116 may support communication between internal terminal(s) 118 and a database 120, possibly containing sensitive information. Such a firewall system 110, however, is subject to attack in many ways.

A hacker operating the host computer 100 can utilize publicly accessible applications on the institutional computer system 106, such as the Web server 108 or the E-mail system 114, to flank attack the firewall system 110 or connect to the internal network port 112. The Web server 108 or the E-mail system 114 may have authority to attach to and communicate through the firewall system 110. The hacker might be able to exploit this by routing packets through, or mimicking these network elements, in order to attach to, attack, or completely bypass the firewall system 110.

Most conventional firewalls are transparent to packets originating from behind the firewall. Hence, the hacker may insert a source address of a valid network element residing behind the firewall 110, such as the terminal 118, to a fictitious packet. Such a packet is usually able to pass through the firewall system 110. Alternatively, the hacker can set the session_active bit in the fictitious packet to pass through the firewall 110. The packet can be configured to contain a message requesting the establishment of a session with the terminal 118. The terminal 118 typically performs no checking, and assumes that such a session request is legitimate. The terminal 118 acknowledges the request and sends a confirmation message back through the firewall system 110. The ensuing session may appear to be valid to the firewall system 110.

The hacker can also attempt to attach to the port 112. A conventional application gateway system forms a connection to the port before the firewall 110 is invoked to verify the authority of the request. If enough connection requests hit the port 112, it may be locked out for a period of time, denying service to both incoming request from the public network, and more importantly, denying access to the internal network 116 for outgoing messages. It is readily apparent that conventional firewall systems, such as the one depicted in FIG. 1, are unacceptably vulnerable in many ways.

It is readily apparent that the design and implementation of conventional firewalls has rendered them highly vulnerable to hacker attack. What is needed is a true firewall system that overcomes the foregoing disadvantages and is resistant to hacker attack.

SUMMARY

The present invention overcomes the foregoing disadvantages by providing a firewall system that is resistant to conventional modes of attack. A firewall in accordance with the present invention is a stand-alone system that physically resides between a point of public access and a network element to be protected. A firewall arrangement in accordance with the invention operates on a computing platform that is dedicated to the operation of the firewall. Such a dedicated firewall computing platform is referred to herein as a "firewall box." The firewall box is connected to a protected network element by a single connection. Consequently, any communication from a publicly accessible network element to a protected network element must pass through the firewall box. A network element, or elements, to be protected by the firewall are connected to the backside of the firewall.

In a preferred embodiment the firewall box is a stand alone computing platform dedicated to supporting a firewall application. No other applications, services or processes, other than those related to support of the firewall application (e.g., an operating system), are to be maintained on the dedicated firewall box.

The firewall application running on the firewall box is comprised of a plurality of proxy agents. In a preferred embodiment, individual proxy agents are assigned to designated ports to monitor, respond to and verify incoming access requests (i.e., incoming packets) received on the port. Port management by the OS or port management programs is limited to simply assigning an appropriate proxy agent to an incoming access request on a port. The assigned proxy agent immediately verifies the access request before a connection is formed. Using simple verification checks, the proxy agent determines the authority of the access request, quickly and efficiently discarding unauthorized requests without unduly burdening system resources. If the access request is authorized, the assigned proxy agent opens, and thereafter manages, the port connection. In this way, the proxy agent is able to repel denial of service attacks without resorting to shutting down the port.

In a preferred embodiment, a proxy agent is assigned to a request based on the service associated with an access request (e.g., the Telnet port number is indicated). Each proxy agent is thus protocol sensitive to the particular service requirements of an incoming request and can respond with appropriately formatted messages. However, if the protocol of an access request is not configured in accordance with the protocol normally associated with that port, the request is discarded. If proper, the proxy agent can then initiate a set of verification checks to ensure the authority and authenticity of the access request.

Verification tests performed by a proxy agent can involve any variety of checks, including, but not limited to: determinations of valid destination addresses; determination of valid user, or user/password information; validity of an access in view of the time period of the access; presence of executable commands within an access request; or any combination of the latter, or like determinations. Such tests are not performed in conventional firewall systems.

Upon confirming the validity of an incoming access request, a proxy agent initiates the connection to a network element indicated in the access request, or in response to a prompt issued to a user, on behalf of the incoming access request. This has the effect of shielding the identity of network elements on each side of the firewall from a hacker who taps a connection on either side of the firewall. The firewall also can be used in combination with a packet filtering scheme to protect against IP spoofing and source based routing.

BRIEF DESCRIPTION OF THE DRAWINGS

The foregoing, and other objects, features and advantages of the present invention will be more readily understood upon reading the following detailed description in conjunction with the drawings in which.

DETAILED DESCRIPTION

Figure 1:
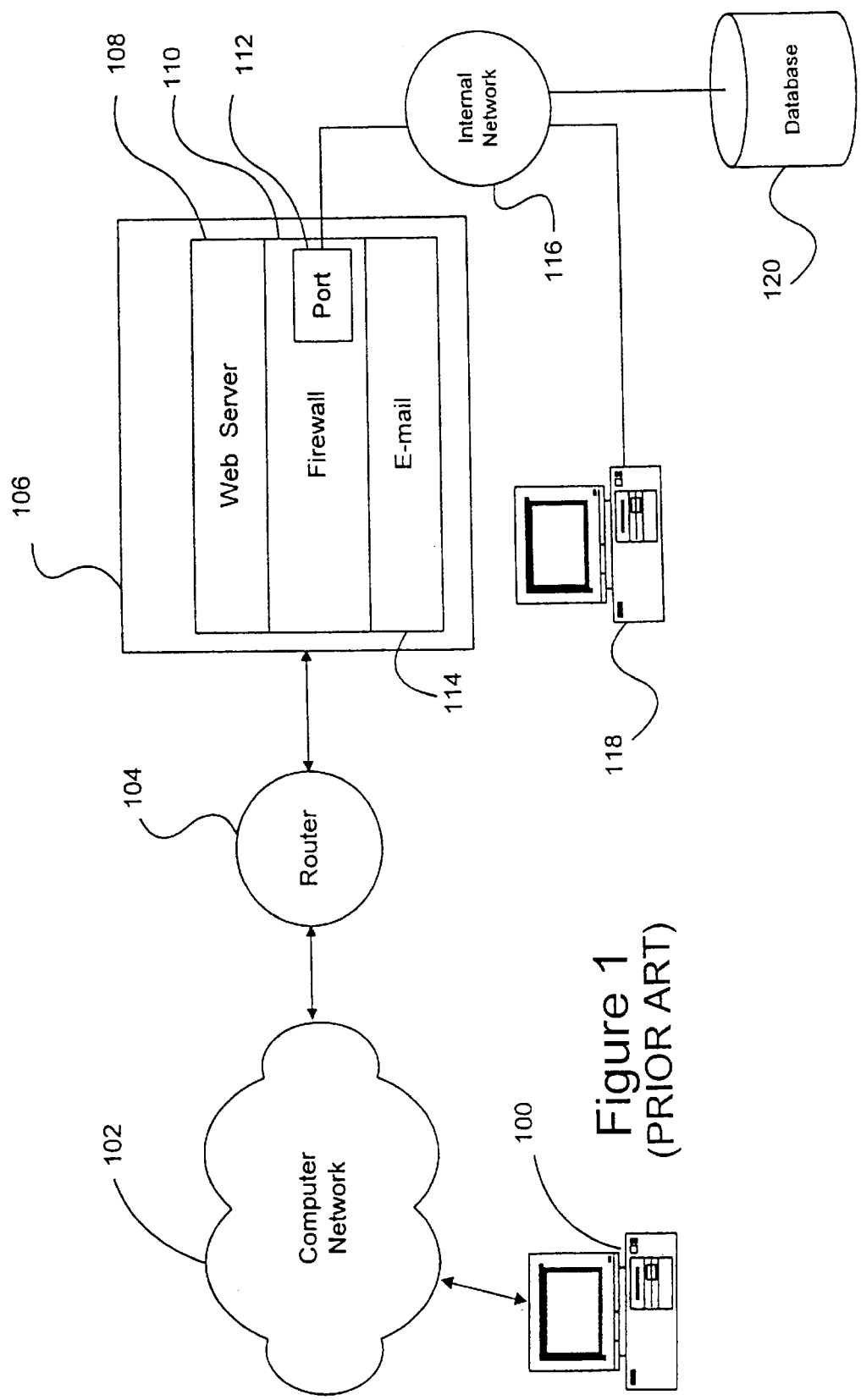
FIG. 1 depicts a computer network arrangement having a conventional firewall arrangement.
Figure 2:
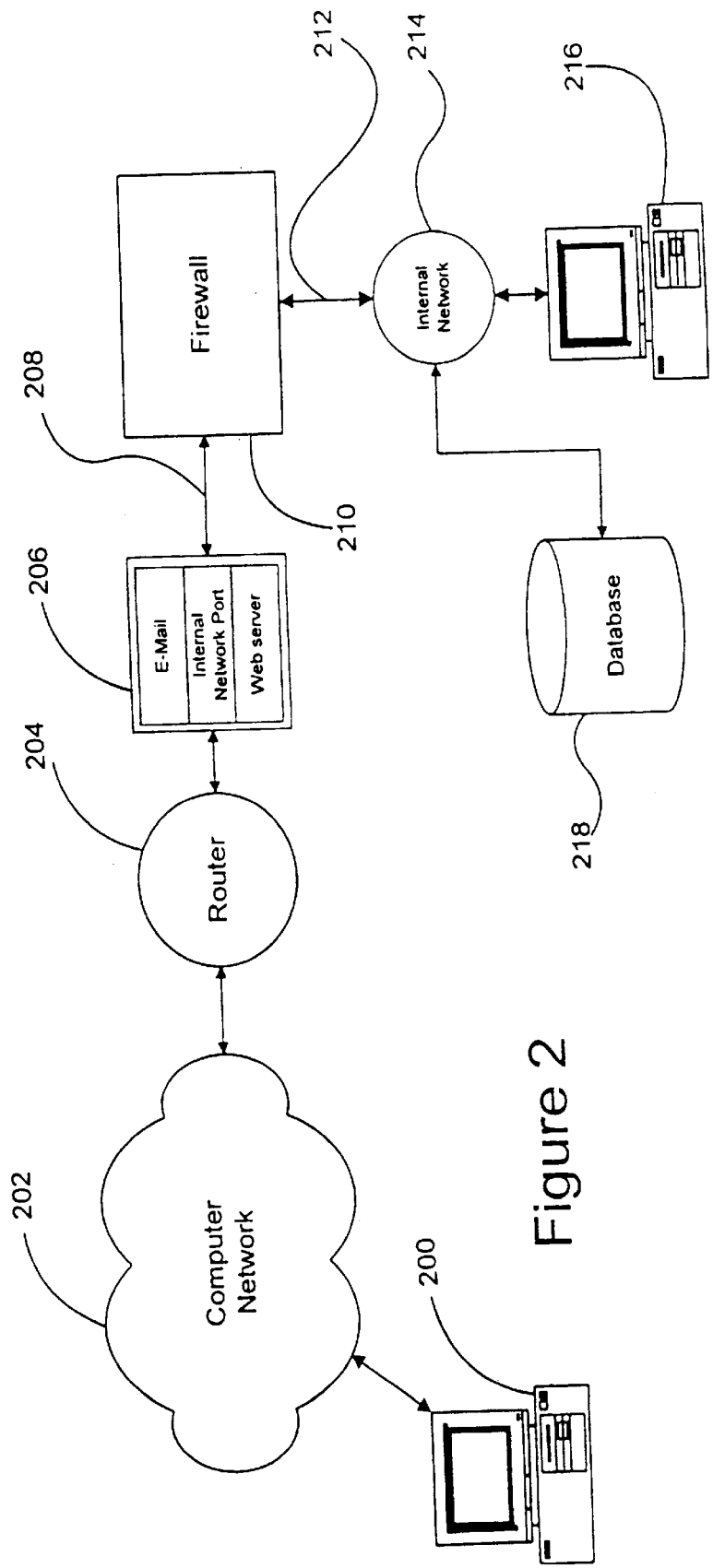
FIG. 2 depicts an exemplary computer network arrangement including a firewall arrangement incorporating the present invention.

FIG. 2 depicts a block diagram of an exemplary system incorporating the invention. Network elements in the form of a terminal 216 and a secure database 218 are connected to an internal network 214 that is protected behind a firewall 210. The connection 212 between the internal network 214 and the firewall 210 is preferably the only connection between these two elements. A publicly accessible computing system is connected to a public network 202 through a router 204. A connection 208 between the firewall 210 and the publicly accessible computing system 206 is preferably the sole connection between the firewall 210 and the publicly accessible system 206. By providing the firewall 210 in this stand alone configuration, any and all access from the public network 202 to the internal network 214 must go through the firewall 210. Hence, a user operating a host machine 200 who attempts to access the internal network 214 via the public network 202 must go through the firewall 210. This arrangement is more robust than conventional firewall systems that are susceptible to being bypassed either physically or through applications sharing the firewall computing platform.

In preferred embodiments of the invention, the firewall 210 runs on a dedicated firewall box. That is, the computer upon which the firewall 210 is running, is dedicated to the firewall application. The processes, programs and applications running on the firewall computing platform are those involved with firewall processes, or their support (i.e., the computer's operating system). Consequently, there is reduced risk of the firewall being bypassed through applications sharing the firewall's computing platform. The addition of other, unrelated, applications to the firewall box merely compromises the integrity of the firewall.

The firewall 210 application is comprised of a variety of access request validation programs referred to herein as "proxy agents." Proxy agents investigate incoming requests that seek to access network elements residing behind the firewall 210. The nature of incoming access requests can vary according to a particular port, or service (e.g., HTTP, Telnet, File Transfer Protocol (FTP)) that the incoming request seeks to attach to. Accordingly, the firewall 210 application assesses the characteristics of an incoming request and assigns an appropriate proxy agent tailored to the particular protocol and verification requirements of that incoming access request. In a preferred embodiment, there is a designated proxy agent for each port. The proxy agent assigned to a port performs all of the verification processes and management of the port without involving the operating system, or a port manager (as in conventional systems). Because it is dedicated to a particular port, a proxy agent is capable of providing a more efficient handling of an incoming request from both a protocol and a verification standpoint. The proxy agent makes an immediate verification check of an access request before initiating a port connection. If the access is deemed suspect, it is immediately discarded. The use of proxy agents is more efficient than conventional chained processes involving OS based verification routines and port management programs that are generic to incoming access requests. By immediately checking for and discarding suspect packets, the proxy agent is capable of resisting denial of service attacks without having to shut down the port.

In accordance with another aspect of exemplary embodiments of the invention, a proxy agent can include a tailored set of verification tests. The rigorousness of the tests can be dictated by the characteristics of the access request. For instance, the source address of an access request can be investigated to determine whether the request is suspect or credible. An inherently reliable request may require only a minimum of verification before being connected. While a suspect request may require enhanced verification. Access request verification can include analysis of: source host machine and source user information; destination host machine and destination user information; and/or time of day analysis. These or other tests can be interactive in nature and prompt a source user to enter user/password information. In some cases a user may be required to enter a valid destination machine address or ID. In accordance with exemplary embodiments of the invention any combination of the foregoing, or other, tests can be performed by a given proxy agent depending on the verification requirements of a particular incoming access request.

Figure 3:
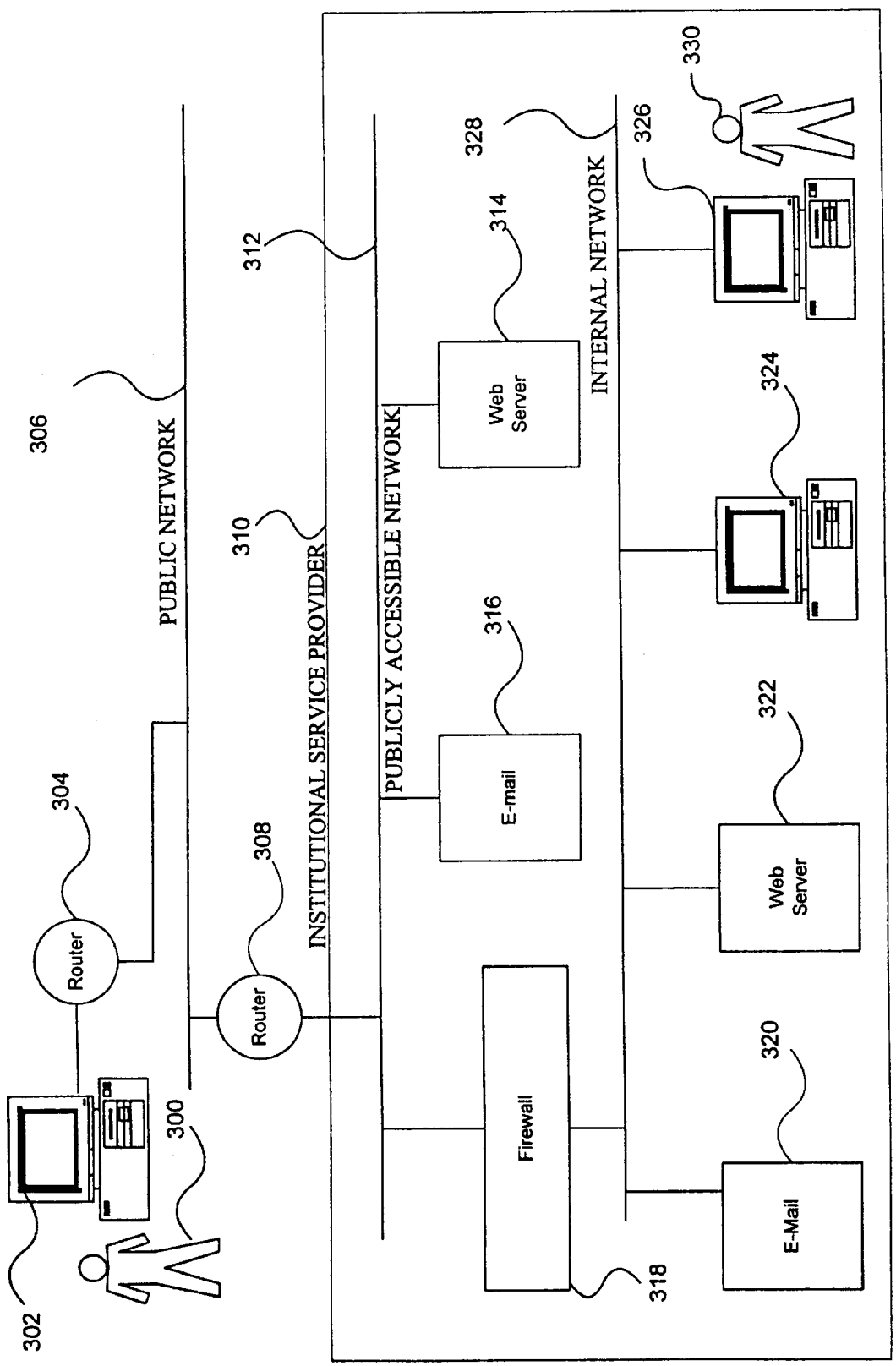
FIG. 3 depicts another exemplary computer network arrangement including a firewall arrangement incorporating the present invention.

A more detailed depiction of an exemplary system in accordance with the present invention is shown in FIG. 3. The figure illustrates a network scenario involving communication over a public network 306, such as the Internet. An institutional service provider 310 is attached to the public network 306 through a router 308. The institutional service provider 310 has a publicly accessible network 312. A user 300 operating a host computer 302 can access the publicly accessible network 312 through the public network 306 (via routers 304 and 308, respectively).

The institutional service provider 310 may be an ISP that develops software on internal computers 324 and 326 for distribution and sale. Free software can be supplied to users who access a public Web server 314 on the internal, publicly accessible, network. The institutional user 310 also may provide information about its products or services by establishing a home page on the publicly accessible Web server 314. The publicly accessible network 312 also may have a public E-mail system 316. Authorized subscribers may be permitted to access proprietary software offered on a protected Web server 322 by accessing the institution's internal network 328. The internal network 328 also can have a secure E-mail system 320 for internal communication. The internal network 328 is protected from public access by a firewall 318 incorporating the present invention.

The firewall 318 permits the internal network 328 to be attached to the public network 306 (through the publicly accessible network 312) without rendering the secure network 328 open to public access. The firewall 318, in accordance with preferred embodiments of the invention, physically separates the publicly accessible network 312 from the internal network 328. Consequently, all communications attempting to access the internal network 328, or any network elements attached thereto, must pass through the firewall 318. To secure it from direct (i.e., keyboard) access, the firewall 318 is preferably maintained in a secure location on the premises of the institution 310.

The firewall 318 can run on a general purpose computer. Such a computer, in accordance with preferred embodiments, is a stand alone machine, or firewall box, dedicated to the firewall application. The addition of other programs to the firewall box merely undermines the strength of the firewall 318. Such additional programs can be used to bypass, or attach to and attack the firewall 318.

The firewall application comprises a plurality of proxy agents that are assigned to investigate and handle an incoming access requests. A proxy agent is preferably assigned in accordance with a port number designation indicated in a request. The assigned proxy agent processes the access request, forms the connection, if verified, and manages the completed connection. A designer can dictate what set of verification tests are to be run on a particular incoming request. For instance, an assigned proxy agent can first check to ensure that the protocol of the access request matches that of the indicated port. If there is a discrepancy, the request is denied. A next check can involve investigation of a source address (i.e., the host machine from which the access inquiry originated) of the access request. This permits the proxy agent to make an initial assessment of the authenticity of the request. If a particular source has a higher probability of generating suspect packets (e.g., an unknown university computer) a proxy agent can optionally invoke a more rigorous series of verification tests. However, if the source is inherently secure (e.g., a firewall protected machine at a company's headquarters communicating with their R&D site) the proxy agent might proceed directly to connecting the incoming request with a destination host machine. Once the source is determined, the proxy agent can run an appropriate combination of verification checks suited to the integrity of the request as indicated by its source. In the event that a legitimate user is accessing a protected network element using suspect computer (e.g., a visiting professor logging on to a university's host computer rather than his or her office computer) it may be advantageous to allow such a user through, but only after a more rigorous set of interactive verification tests. However, the packet source address need not necessarily dictate the particular combination of verification tests performed by the proxy agent. A proxy agent can have a fixed set of verification tests based on the port designation. The particular selection of verification checks is discretionary. Several such checks are described below.

Source address verification can be based on a check of the validity of on or more specific addresses, or, on a range of address values (e.g., the first octet has a value of between zero and 100). Such a check involves a determination of whether a host source address of an incoming packet comports with a list of authorized or unauthorized addresses, or is within a designated range. If the source address is not on the list, the packet is discarded. Referring back to FIG. 3, in the event that the external user 300 attempts to contact a network element behind the firewall 318, the proxy agent can check the source address of the host computer 302. If the proxy agent determines that the host computer 302 does not have an authorized address, the request originating from the host computer 302 is discarded.

A second check can be used to determine the authority of an access request based on the identity of a user seeking to gain access. This may involve interactively prompting the user 300 to enter either a user name, or a user/password combination. Because the proxy agent is protocol sensitive, it is designed to issue prompts in accordance with the format indicated by the port number of the incoming access request. A particular user may have limited access, in which case the user may be prompted to enter the address of the destination machine to be accessed. If the proxy agent determines that the user is not authorized to access the requested destination machine, the user can be re-prompted to enter another destination machine, or the request can be discarded altogether.

A third check can be performed to determine whether the time period during which an access request is being made is authorized in and of itself, or for a particular user, source address, or destination address indicated in the request. For example, the check can permit access to a certain class of network elements during certain periods (e.g., between 7:00 am and 5:00 p.m. U.S. pacific standard time). The time period check can include any combination of time of day, day of week, week of month, month of year, and/or year.

A fourth check can be invoked to determine whether the destination address indicated by an access request is authorized. This check can be performed by examining packet destination address information, or possibly by prompting a user to enter the information. For example, in File Transfer Protocol (FTP) requests, the user may be required to enter the destination address (e.g., "usemame@host") in response to a prompt generated by the assigned proxy agent.

A proxy agent can also run tests that intercept and discard any messages that attempt to initiate a process on the firewall 318 itself. For example, a conventional system having bundled applications may include an application such as SendMail. SendMail, in addition to providing mail delivery, also contains features for collecting and tracking source and destination information of mail messages. The information derived by a hacker through execution of such SendMail commands can be used to gain access to secure network elements. Hence, a proxy agent in accordance with the invention can include, within its set of tests, a check for ferreting out and discarding packets having nested executable commands. A firewall incorporating the invention can, however, facilitate the communication of normal electronic messages. Hence, valid mail can be passed through the firewall 318 to an internal E-mail system 320 if otherwise authorized.

The checks described do not represent an exhaustive list of available verification checks. They merely represent a variety of access validation checks and are described to assist in describing exemplary embodiments of the invention. The particular combination of tests is discretionary. Other checks can be added as deemed fit or necessary for a particular scenario.

After a proxy agent successfully completes its set of one or more verification tests, the proxy agent initiates a connection request to the destination machine (and port) on behalf of the incoming access request. The purpose of this practice is to maintain anonymity on each side of the firewall. A party tapping either of the connections entering or exiting the firewall only "sees" the elements on each side of the tap, but not those beyond the tap.

In accordance with another aspect of exemplary embodiments of the invention, security is supplemented by performing packet filtering on incoming access request packets. Such packet filtering can be provided either by the operating system of the firewall box, or by a router, such as router 308. In accordance with preferred embodiments, the packet filtering is directed to eliminating source based routing. Therefore, the packet filter maintains a list of addresses corresponding to network elements residing behind the firewall 318. If any incoming access request has a source address of a network element behind the firewall 318, that packet will be intercepted and discarded.

Figure 4A:
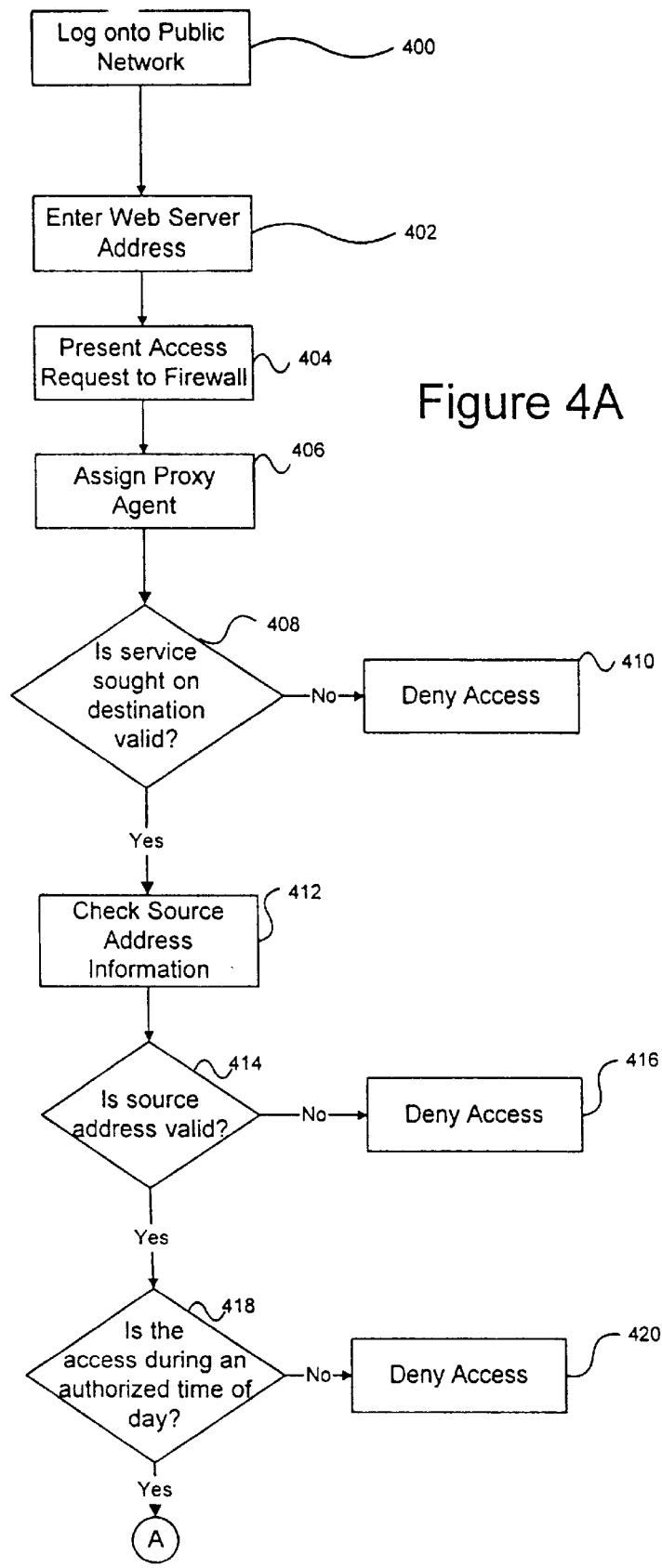
FIGS. 4A and 4B depict a flow diagram depicting an exemplary process incorporating the present invention.
Figure 4B:
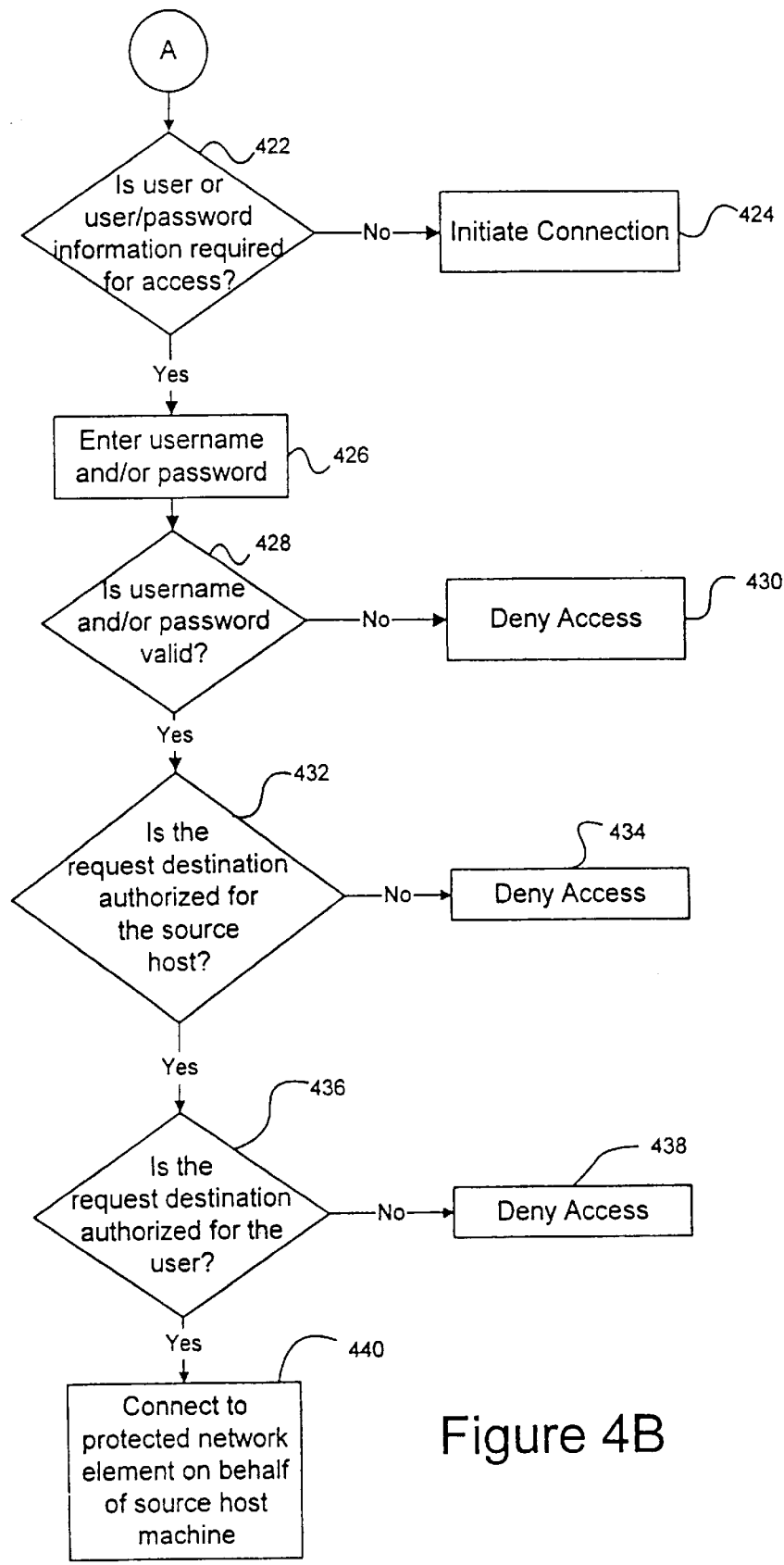

FIGS. 4A and 4B depict a flow diagram of an exemplary process for analyzing an access request received at the firewall 318 of FIG. 3. The process described is merely exemplary, and any combination of checks or steps may be performed in accordance with a selected combination of checks. Furthermore, the order of step execution can be altered as needed for a particular scenario.

Consider the situation where the user 300 in FIG. 3 is authorized to access the Web server 322 that resides behind the firewall 318. To access the Web server 322, the user 300, operating the host computer 302, first logs onto to a public network (step 400), that is compatible with TCP/IP protocols. To access the Web server of the institution 310, the user 300 enters an appropriate address (step 402), such as "http:\\webwho.com". The access request is received by a router 304 which forwards the message to the Internet 306. The Internet may forward the message through a series of routers and present it to a router 308 that services the institution 310.

Because the access request seeks to access a destination address residing behind the firewall 318, the access request message is presented to the firewall 318 (step 404). In accordance with an exemplary embodiment, a proxy agent running on the firewall 318 is assigned to the access request in accordance with a preliminary analysis of the port number designation within the packet representing the access request (step 406). In this case, port number 80 (HTTP) would ordinarily be designated in the request. The assessment also can involve a determination of whether the service indicated by the port number comports with the contents of the request (step 408). That is, does the request indicate one service (port number) while being formatted for another. If there is a disparity, the access is denied (step 410).

The proxy agent can then analyze a source address to determine whether the host computer 302 from which the message originated is authorized to access the secure Web server 322 (step 412). As described above, this check can be used to optionally invoke a more rigorous set of verification checks if the source is unknown or suspect. This assessment can involve a comparison of the source address with a list of authorized or unauthorized addresses maintained by the proxy agent (step 414). In the exemplary case here, if the source address is not authorized (i.e., the source address is not on the list), the access request is denied (step 416). The extent to which a proxy agent verifies the validity of an access request can vary. It should be noted that in some cases, a proxy agent may need do little more than verify address information before initiating a connection to the destination device on behalf of the source host. Alternatively, if a source address is suspect, or a proxy agent's set of checks is fixed, the proxy agent can perform additional checking.

In the present exemplary scenario the access request message is further analyzed to determine whether the access request is being received during an authorized time period, such as a time of day (step 418). If the time of day during which the access request is received is not authorized, the connection request is denied (step 420). The time of day assessment can be tailored for specified users, source host machines, and/or IP addresses. For example, to prevent evening hacking by users in Canada, North, and South America, such users may be denied access other than during normal U.S. business hours. A user in India, however, operating during Indian daylight hours, may be allowed to access the system during U.S. evening hours.

A proxy agent also can assess whether user or user/password information is necessary to gain access (step 422). If not, the proxy agent can initiate the connection (step 424). If the information is required, the proxy agent prompts the user with an appropriately formatted message to enter a username and/or password information (step 426). The user name and/or password information is checked (step 428). If an unauthorized user name is entered, or the password is invalid, the access request is denied (step 430). If a valid user name, or user/password combination is entered, the proxy agent can make further assessments, if deemed necessary or appropriate, to determine whether the host machine 302 is authorized to access the particular destination (e.g. Web server 322) (step 432). If not authorized, the access is denied (step 434). An additional proxy agent check can determine whether the particular network element to which the user 300 is attempting to gain access to is available to the particular user (step 436). If not authorized, the access request is denied (step 438).

If after the proxy agent has completed its set of tests it is determined that the access request is authorized, the proxy agent initiates a connection to the Web server 322 on behalf of the source machine 300 (step 440). Because the firewall forms a connection (using a proxy agent) following the completion of validation checks associated with the proxy agent's test set, the firewall functions as a Bastion host, or firewall server, on behalf of the access request source. By using the firewall as a Bastion host, or firewall server, to act on behalf of the user accessing the secure network 328, the identity of internal network elements is not revealed because the firewall 318, acting as an intermediary, shields the identity of the network elements for whom it is acting on behalf of. All the external user sees, in terms of addresses, is the firewall. If an internal connection is tapped onto, a valid source address or user identity is not available to the hacker as the firewall 318 appears to be the source of the connection. Hence, a firewall arrangement in accordance with the invention provides two-way transparency.

Another aspect of an exemplary embodiment of the invention involves sending an "out-of-band" system message in response to a username or username/password combination provided by a user. Such a system involves communicating a password, or password portion, back to a user on a communication medium other than the computer network being used. The user enters the information received by out-of-band means to complete a logon process. For example, a user can be prompted to enter their username and the first half of a password. The system receiving this information, upon verifying it, sends back the remaining half of the password to the user by automatically generating a phone call to a beeper provided to the user. The beeper's display indicates the remaining password portion which is then entered by the user to complete the logon. The identity of the user is thereby authenticated. A hacker does not possess the means to receive the out-of-band response (i.e., the beeper). The password, or password portion sent back to the user by out-of-band means can be a random number generated by the firewall system.

Another aspect of exemplary firewall systems operating in accordance with the invention is that all processes, including proxy agents, running on the firewall, operate in a "daemon mode." When a computer operating system receives a request to perform a task it will open up a job and designate a corresponding job number in order to provide and manage resources associated with that job. When the task is completed the operating system designates the job for closure. However, the actual closure of the job and removal of the corresponding job number does not always take place immediately because it is considered to be a low priority task. This occasionally leaves an idle job open on the system awaiting closure. Hackers have learned that they can exploit such an idle job, reactivate its status, and access resources available to the job. By operating in a daemon mode, the operating system of the firewall box immediately shuts down jobs following the completion of designated tasks.

When a computer upon which the firewall is running is operating in a UNIX environment, there are UNIX-specific security measures that can be invoked. One such security measure is the "changeroot" feature. A "root" user is a user having high levels of access to files branching from a "root directory." If a network intruder can access a root directory, the network intruder may be able to access to the files hierarchically emanating from the root directory. In accordance with another aspect of a secure database system incorporating the present invention, all jobs running on the firewall system and on the secure database system are preceded by a "changeroot" command to change the identity of the root directory. A new root directory is created by execution of this command that can be used for transaction-specific purposes. This new directory does not have access to any of the original file directories branching from the original root directory. Consequently, if a hacker is able to access information associated with a job, corresponding root directory data will be useless.

Another aspect of a system in accordance with the invention is the use of aliases by the firewall when addressing machines residing behind the firewall. A machine behind the firewall can be addressed by the firewall according to an alias of its actual IP address. Hence, if a hacker is somehow able to tap the firewall, any addresses detected by the hacker corresponding to machines attached to the backside of the firewall will be fictitious.

An additional security feature that can be provided in the firewall system is a transaction log. Such a log gathers information associated with any access request message seeking to connect to or inquire about network elements residing behind the firewall. Information gathered in such a transaction log may include, but is not limited to, the source address (what is the identity of the machine from which the request originated), the IP address (which Internet port system did the request originate over), the destination address (who is the request trying to reach), time of access, and/or the identity of user (who is using the source machine). This information can facilitate the identity of a hacker if the hacker's activities require legal attention.

The exemplary scenarios described above are directed primarily to situations where outside users are attempting to access network elements residing behind a firewall. It should be noted, however, that a firewall in accordance with the present invention also can be utilized to monitor and control packet traffic originating from behind a firewall, allowing and disallowing connection based upon predetermined rules. Hence, a firewall incorporating the invention also can be used to control what, where, who, how and when a user behind the firewall can access the outside world. This can be done in addition to monitoring and controlling incoming traffic.

Because exemplary embodiments involve the operation of computing systems, an exemplary embodiment of the invention can take the form of a medium for controlling such computing systems. Hence, the invention can be embodied in the form of an article of manufacture as a machine readable medium such as floppy disk, computer tape, hard drive disk, CD ROM, RAM, or any other suitable memory medium. Embodied as such, the memory medium contains computer readable program code which causes a computing system upon which the firewall system is running to function or carry out processes in accordance with the present invention.

An exemplary application of the invention has been described protecting an internal network. However, one skilled in the art will readily appreciate and recognize that the firewall system or method of operation in accordance with the invention can be applied in any scenario requiring the protection of network elements that are attached to a publicly accessible medium, such as the Internet. The invention provides the benefit of attaching a system to a public network with reduced apprehension of that system being compromised over the public network.

The invention has been described with reference to particular embodiments. However, it will be readily apparent to those skilled in the art that it is possible to embody the invention in specific forms other than those of the embodiments described above. Embodiment of the invention in ways not specifically described may be done without departing from the spirit of the invention. Therefore, the preferred embodiments described herein are merely illustrative and should not be considered restrictive in any way. The scope of the invention is given by the appended claims, rather than by the preceding description, and all variations and equivalents which fall within the range of the claims are intended to be embraced therein.

What is claimed is:

1. A firewall system for protecting network elements comprising:

a computing platform having a microprocessor and memory storage, wherein said computing platform provides access from a network connection to at least one network element, wherein said memory contains instructions causing said microprocessor to perform the steps of:

initializing a plurality of proxy agents, wherein each of said proxy agents is assigned a corresponding port number and protocol;

verifying that incoming connection requests are formatted in accordance with said corresponding protocol;

logging information associated with incoming connection requests; and, processing received packets to determine the presence of executable commands nested within received packets, and if detected, discarding said received packets.

* * * * *

(12) EX PARTE REEXAMINATION CERTIFICATE (8120th)
United States Patent
Coley et al.

(10) Number: US 6,061,798 C1
(45) Certificate Issued: Mar. 29, 2011

(54) FIREWALL SYSTEM FOR PROTECTING NETWORK ELEMENTS CONNECTED TO A PUBLIC NETWORK

(75) Inventors: Christopher D. Coley, Morgan Hill, CA (US); Ralph E. Wesinger, Jr., Livermore, CA (US)

(73) Assignee: Network Engineering Software, Inc., San Jose, CA (US)

Reexamination Request:
No. 90/009,059, Feb. 28, 2008

Reexamination Certificate for:
Patent No.: 6,061,798
Issued: May 9, 2000
Appl. No.: 09/174,723
Filed: Oct. 19, 1998

(51) Int. Cl.
*H04L 29/06* (2006.01)

(52) U.S. Cl. .................................................... 726/12
(58) Field of Classification Search .................. None
See application file for complete search history.

(56) References Cited

U.S. PATENT DOCUMENTS

| | | | |
|---|---|---|---|
| 5,319,776 | A | 6/1994 | Hile |
| 5,414,833 | A | 5/1995 | Hershey |
| 5,606,668 | A | 2/1997 | Shwed |
| 5,623,600 | A | 4/1997 | Ji |
| 5,623,601 | A | 4/1997 | Vu |
| 5,632,011 | A | 5/1997 | Landfield |
| 5,758,083 | A | 5/1998 | Singh et al. |
| 5,822,539 | A | 10/1998 | van Hoff |
| 5,826,025 | A | 10/1998 | Gramlich |
| 6,243,752 | B1 | 6/2001 | Butt |
| 6,515,968 | B1 | 2/2003 | Combar et al. |
| 6,571,338 | B1 | 5/2003 | Shaio |
| 2009/0037991 | A1 | 2/2009 | Ellis et al. |

OTHER PUBLICATIONS

Cheswick, W.R. & Bellovin, S.M.: Book, "Firewalls and Internet Security: Repelling the Wiley Hacker"; 1994; Addision-Wesley.
Borenstein, N. & Freed, N.: Specification, "RFC 1521—MIME (Multipurpose Internet Mail Extensions)"; Sep. 1993; Network Working Group.
GreatCircle Firewall Mailing List (excerpts); Mar. 29 to Jun. 21, 1994.
"Screening External Access Link (SEAL) Introductory Guide"; 1992; Digital Equipment Corporation.
"Screening External Access Link (SEAL) Consulting Service—Service Description"; 1993; Digital Equipment Corporation.
"Digital's Firewall Service Administrator's Guide"; Aug. 31, 1994; Digital Equipment Corporation.

*Primary Examiner*—Joseph R Pokrzywa

(57) ABSTRACT

A firewall for isolating network elements from a publicly accessible network to which such network elements are attached. The firewall operates on a stand alone computer connected between the public network and the network elements to be protected such that all access to the protected network elements must go through the firewall. The firewall application running on the stand alone computer is preferably the only application running on that machine. The application includes a variety of proxy agents that are specifically assigned to an incoming request in accordance with the service protocol (i.e., port number) indicated in the incoming access request. An assigned proxy agent verifies the authority of an incoming request to access a network element indicated in the request. Once verified, the proxy agent completes the connection to the protected network element on behalf of the source of the incoming request.

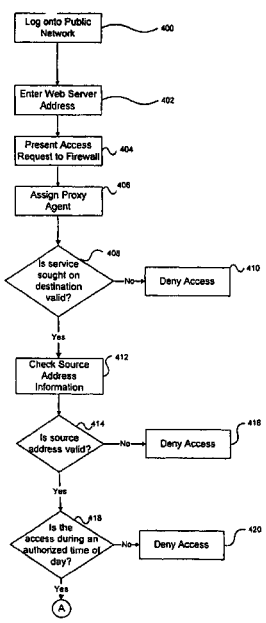
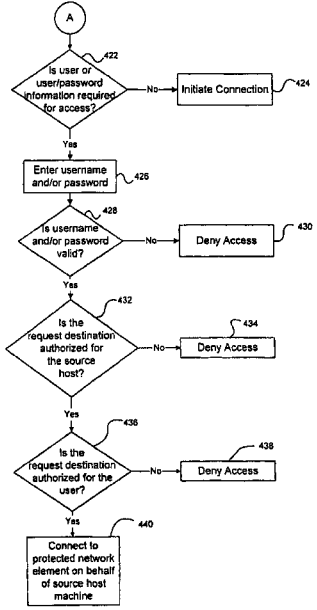

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

\* \* \* \* \*